(12) United States Patent
Chang

(10) Patent No.: US 7,819,570 B2
(45) Date of Patent: Oct. 26, 2010

(54) OPTICAL PLATE AND BACKLIGHT MODULE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 311 days.

(21) Appl. No.: 11/862,203

(22) Filed: Sep. 27, 2007

(65) Prior Publication Data

US 2008/0285287 A1    Nov. 20, 2008

(30) Foreign Application Priority Data

May 18, 2007    (CN) .......................... 2007 1 0200653

(51) Int. Cl.
*F21V 7/04* (2006.01)
(52) U.S. Cl. .................. 362/628; 362/612; 362/613; 362/615; 362/621
(58) Field of Classification Search ................. 362/612, 362/613, 615, 621, 628
See application file for complete search history.

(56) References Cited

U.S. PATENT DOCUMENTS

| | | | |
|---|---|---|---|
| 2003/0058390 A1* | 3/2003 | Fujii ........................... | 349/113 |
| 2007/0086179 A1* | 4/2007 | Chen et al. ..................... | 362/27 |
| 2007/0263408 A1* | 11/2007 | Chua .......................... | 362/612 |
| 2008/0055931 A1* | 3/2008 | Verstraete et al. ........... | 362/612 |
| 2008/0130317 A1* | 6/2008 | Shimura et al. .............. | 362/620 |
| 2008/0252980 A1* | 10/2008 | Hebrink et al. .............. | 359/599 |
| 2009/0160758 A1* | 6/2009 | Manabe et al. .............. | 345/102 |
| 2009/0196069 A1* | 8/2009 | Iwasaki ....................... | 362/613 |

* cited by examiner

*Primary Examiner*—Sandra L O'Shea
*Assistant Examiner*—William J Carter
(74) *Attorney, Agent, or Firm*—Frank R. Niranjan

(57) ABSTRACT

An exemplary optical plate includes one or more transparent plate section. The transparent plate section includes a light output surface, a bottom surface, a plurality of spherical depressions, a plurality of protruding structures and one or more lamp-receiving portion. The light output surface is opposite to the bottom surface. The spherical depressions are formed on the bottom surface. The protruding structures are formed on the light output surface. Each protruding structure includes two conical frustums aligned at a center axis and stacked together. The lamp-receiving portion is defined in the bottom surface. A backlight module using the present optical plate is also provided.

15 Claims, 9 Drawing Sheets

OPTICAL PLATE AND BACKLIGHT MODULE USING THE SAME

CROSS-REFERENCE TO RELATED APPLICATIONS

This application is related to twenty one co-pending U.S. patent applications, which are: applications Ser. Nos. 11/835,425, 11/835,426, 11/835,427, 11/835,428, 11/835,429, 11/835,430, and 11/835,431, filed on Aug. 8, 2007, and all entitled "OPTICAL PLATE AND BACKLIGHT MODULE USING THE SAME", application Ser. No. 11/836,799 filed on Aug. 10, and entitled "OPTICAL PLATE AND BACKLIGHT MODULE USING THE SAME", application Ser. No. 11/842,170, filed on Aug. 21, 2007, and entitled "OPTICAL PLATE AND BACKLIGHT MODULE USING THE SAME", applications Ser. Nos. 11/843,670 and 11/843,669, filed on Aug. 23, 2007, and both entitled "OPTICAL PLATE AND BACKLIGHT MODULE USING THE SAME", application Ser. No. 11/845,100, filed on Aug. 27, 2007, and entitled "OPTICAL PLATE AND BACKLIGHT MODULE USING THE SAME", applications Ser. Nos. 11/845,790, 11/845,792, 11/845,793, and 11/845,794, filed on Aug. 28, 2007, all entitled "OPTICAL PLATE AND BACKLIGHT MODULE USING THE SAME", and applications Ser. Nos. 11/850,040 and 11/850,041, filed on Sep. 5, 2007, both entitled "OPTICAL PLATE AND BACKLIGHT MODULE USING THE SAME", and application Ser. Nos. 11/861,310 and 11/861,311, and both entitled "OPTICAL PLATE AND BACKLIGHT MODULE USING THE SAME". In all these co-pending applications excepting application Ser. No. 11/845,790, the inventor is Shao-Han Chang. In application Ser. No. 11/845,790, the inventor is Shao-Han Chang and Fen Chen. All of the co-pending applications have the same assignee as the present application. The disclosures of the above identified applications are incorporated herein by reference.

BACKGROUND OF THE INVENTION

1. Field of the Invention

The present invention relates to an optical plate for use in, for example, a backlight module, the backlight module typically being employed in a liquid crystal display (LCD).

2. Discussion of the Related Art

In a liquid crystal display device, liquid crystal is a substance that does not itself illuminate light. Instead, the liquid crystal relies on light received from a light source to display data images. In the case of a typical liquid crystal display device, a backlight module powered by electricity supplies the needed light.

FIG. 9 represents a typical direct type backlight module 100. The backlight module 100 includes a housing 101, a light reflective plate 102, a light diffusion plate 103, a prism sheet 104, and a plurality of light emitting diodes 105 (hereinafter called LEDs). The housing 101 includes a rectangular base 1011 and four sidewalls 1013 extending around a periphery of the base 1011. The base 1011 and the four sidewalls 1013 cooperatively define a chamber 1017. Each LED 105 includes a base portion 1053 and a light-emitting portion 1051 positioned on the base portion 1053. The LEDs 105 are electrically connected to a printed circuit board (not labeled), and the printed circuit board is fixed to the base 1011 of the housing 101. The light reflective plate 102 is positioned on the LEDs 105 in the chamber 1017. The light reflective plate 102 defines a plurality of through holes (not labeled) that allows the light-emitting portions 1051 of the LEDs 105 to pass through and to emit light to be transmitted to the light diffusion plate 103. The light diffusion plate 103 and the prism sheet 104 are stacked in that order on the chamber 1017. Light emitted from the LEDs 105 is substantially reflected by the light reflective sheet 102 to enter the light diffusion plate 103, and diffused uniformly in the light diffusion plate 103, and finally surface light is outputed from the prism sheet 104.

Generally, a plurality of dark areas may occur because of the reduced intensity of light between adjacent LEDs 105. In the backlight module 100, each LED 105 further includes a reflective sheet 106 positioned on the top of the light-emitting portion 1051, configured for decreasing the brightness of a portion of the backlight module 100 above the LED 105. As a result, the brightness of the backlight module 100 is still not uniform. One method of enhancing the uniformity of brightness of the backlight module 100 is to increase the space between the light diffusion plate 103 and the LEDs 105. This increase in space tends to eliminate potential dark areas. However, increasing the space between the diffusion plate 103 and the LEDs 105 will also increase the thickness of the backlight module and further the overall intensity of the output light rays is reduced.

What is needed, therefore, is a new optical plate and a backlight module using the optical plate that can overcome the above-mentioned shortcomings.

SUMMARY

An optical plate according to a preferred embodiment includes one or more transparent plate section. The transparent plate section includes a first surface, a second surface, a plurality of spherical depressions, a plurality of protruding structures and a lamp-receiving portion. The second surface is opposite to the first surface. The spherical depressions are formed in the first surface. The protruding structures are formed on the second surface. Each of the protruding structures consists of two conical frustums aligned at a center axis and stacked together. The lamp-receiving portion is defined in at least one of the first surface and the second surface.

A backlight module according to a preferred embodiment includes a housing, one or more point light source, an optical plate, and a light diffusion plate. The housing includes a base and a plurality of sidewalls extending around a periphery of the base, the base and the sidewalls cooperatively forming an opening. The point light source is positioned on the base. Each point light source has a light-emitting portion and a reflective member positioned above the top of the light-emitting portion. The same optical plate as described in the previous paragraph is employed in this embodiment. The light-emitting portion of the at least one point light source is inserted in the lamp-receiving portion of the optical plate correspondingly. The light diffusion plate is positioned on the housing over the opening.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout the several views, and all the views are schematic.

DETAILED DESCRIPTION OF THE PREFERRED EMBODIMENTS

Reference will now be made to the drawings to describe preferred embodiments of the present optical plate and backlight module, in detail.

Figure 1:
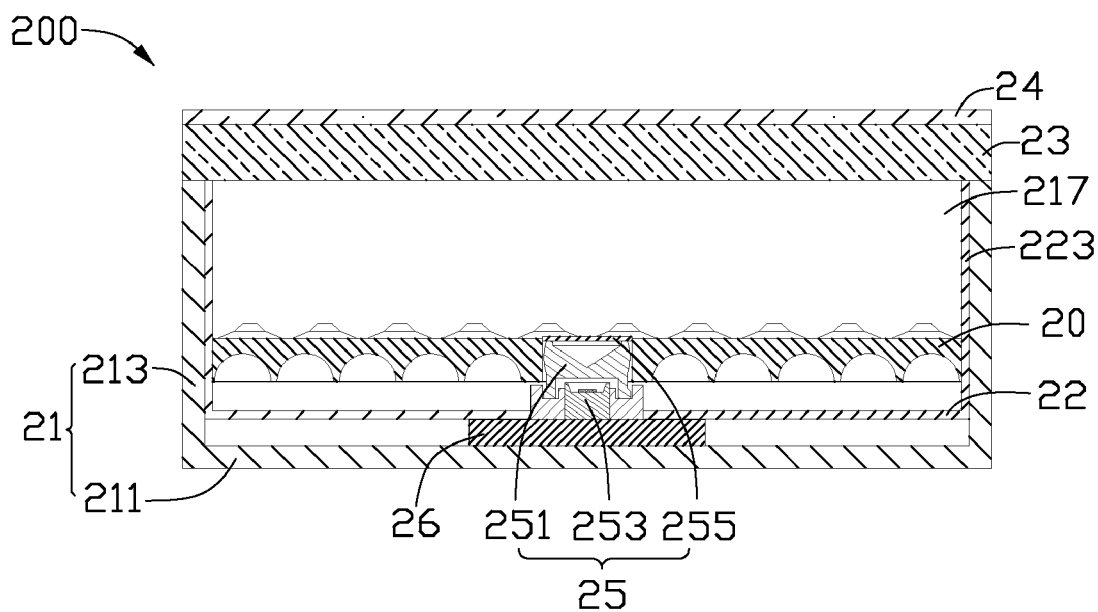
FIG. 1 is a side cross-sectional view of a backlight module using an optical plate according to a first preferred embodiment of the present invention.
Figure 2:
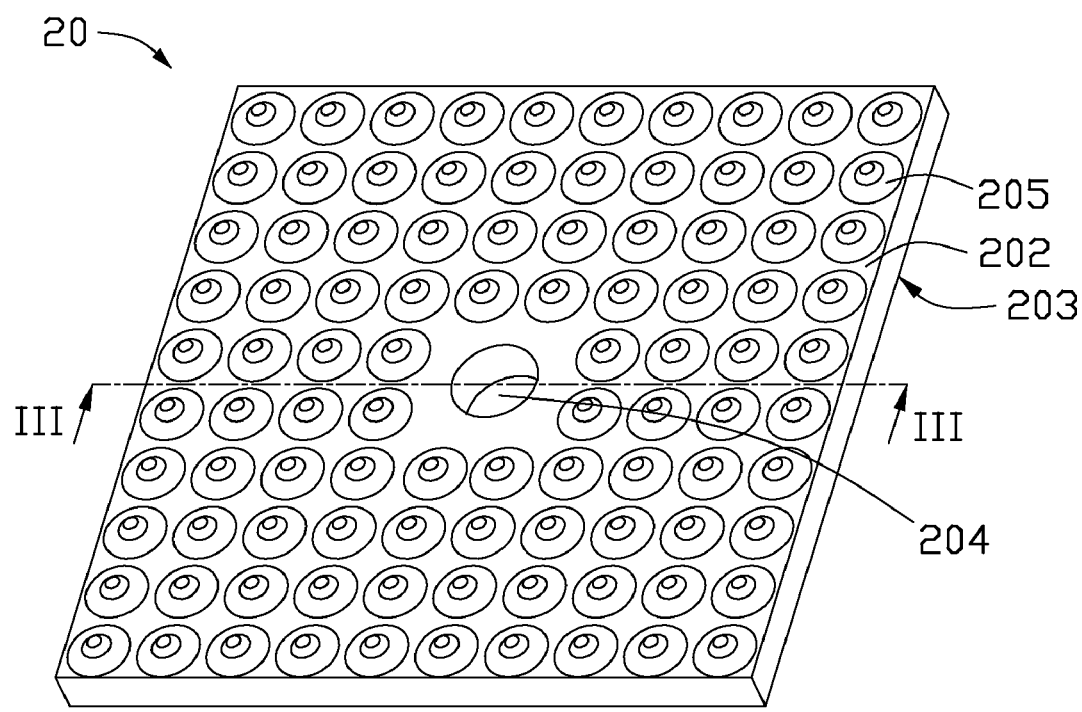
FIG. 2 is an isometric view of the optical plate of FIG. 1.
Figure 3:
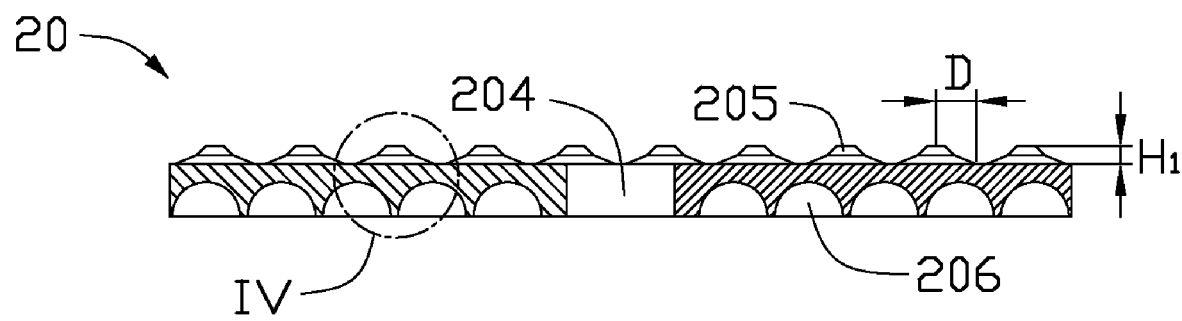
FIG. 3 is a cross-sectional view taken along line III-III of FIG. 2.
Figure 4:
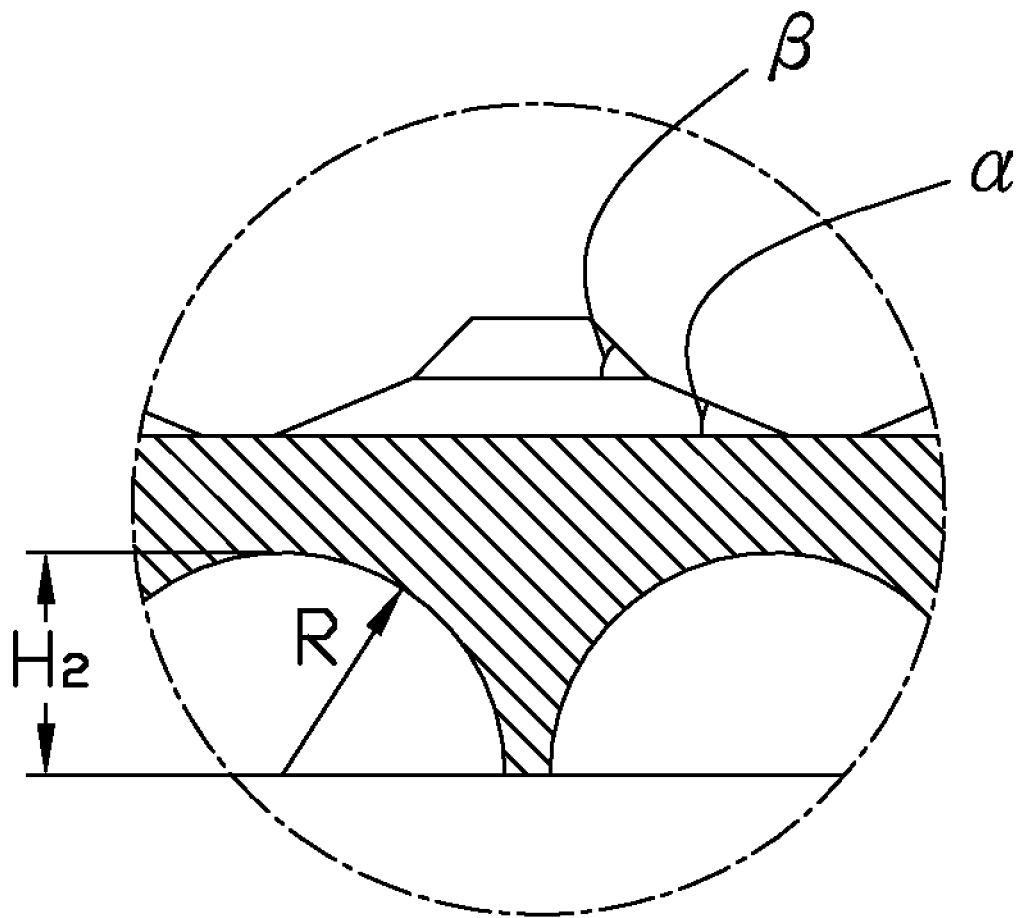
FIG. 4 is an enlarged view of a circled portion IV of FIG. 3.
Figure 5:
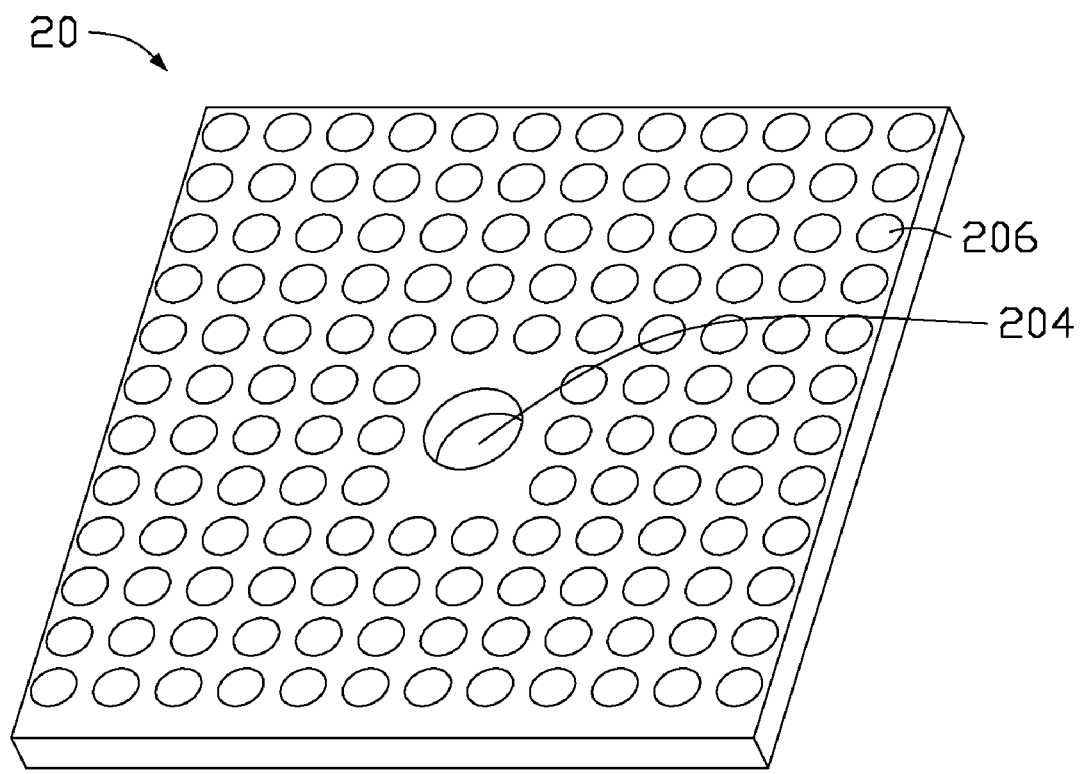
FIG. 5 an isometric, inverted view of the optical plate of FIG. 2.

Referring to FIG. 1, a backlight module 200 in accordance with a first preferred embodiment is shown. The backlight module 200 includes an optical plate 20, a housing 21, a light reflective plate 22, a light diffusion plate 23, and a LED 25. The housing 21 includes a rectangular base 211 and four sidewalls 213 extending around a periphery of the base 211, the base 211 and the sidewalls 213 cooperatively forming an opening 217. The optical plate 20, the light reflective plate 22 and the LED 25 are received in the housing 21. The light diffusion plate 23 is positioned on the housing 21 atop the opening 217.

Referring to FIGS. 2 through 5, the optical plate 20 is a transparent plate that can be mounted into the housing 21. The optical plate 20 includes a light output surface 202 (shown in FIG. 2) and a bottom surface 203 on another side of the optical plate 20 opposite to the light output surface 202. A plurality of protruding structures 205 are formed on the light output surface 202. Each of the protruding structures 205 includes two conical frustums aligned at a center axis and stacked together. A plurality of spherical depressions 206 are formed in the bottom surface 203. The optical plate 20 further includes a lamp-receiving portion 204 defined in a center of the bottom surface 203. In the illustrated embodiment, the lamp-receiving portion 204 is a through hole communicating between the light output surface 202 and the bottom surface 203. The optical plate 20 can be made of material selected from the group consisting of polycarbonate (PC), polymethyl methacrylate (PMMA), polystyrene (PS), copolymer of methylmethacrylate and styrene (MS), and any suitable combination thereof.

The protruding structures 205 are distributed in a matrix manner surrounding the lamp-receiving portion 204 at the light output surface 202, and the spherical depressions 206 are formed in a matrix manner surrounding the lamp-receiving portion 204 in the bottom surface 203. In the illustrated embodiment, each protruding structure 205 has a first conical frustum and a second conical frustum. The second conical frustum is positioned on top of the first conical frustum. In each protruding structure 205, an angle α defined between a conical surface of the first conical frustum relative to a base of the first conical frustum is equal to or smaller than an angle β defined between a conical surface of the second conical frustum relative to the second conical frustum. Each of the angles α, β is larger than zero, and equal to or smaller than 60 degrees. In addition, a diameter D of a base of each protruding structure 205 is configured to be in a range from about 0.02 millimeters to about 4 millimeters. A height $H_1$ of each protruding structure 205 is configured to be in a range from about 0.01 millimeters to about 3 millimeters. A radius R defined by each spherical depression 206 is preferably in a range from about 0.01 millimeters to about 2 millimeters. A maximum depth $H_2$ of each depression 206 is in a range from about 0.01 millimeters to about 2 millimeters.

Also referring to FIG. 1, in the illustrated embodiment, the LED 25 includes a base portion 253, a light-emitting portion 251 positioned on the base portion 253, and a reflective member 255 positioned on the light-emitting portion 251. The LED 25 is electrically connected to a printed circuit board 26 that is fixed to the base 211 of the housing 21. In the illustrated embodiment, the reflective member 255 is a light reflective sheet that is positioned on the top of the light-emitting portion 251. In an alternative embodiment, the reflective member 255 can be a light reflective film formed on the top of the light-emitting portion 251 or on the optical plate 20 above the lamp-receiving portion 204.

The light-emitting portion 251 of the LED 25 is inserted into the lamp-receiving portion 204 of the optical plate 20, and the light output surface 202 of the optical plate 20 faces the light diffusion plate 23. The light reflective plate 22 defines a through hole (not labeled) therein. The light reflective plate 22 is positioned below the bottom surface 203 of the optical plate 20, and the LED 25 passes through the light reflective plate 22 via the through hole.

In use, light emitted from the light-emitting portion 251 of the LED 25 enters the optical plate 20 via an inner surface of the lamp-receiving portion 204. A significant amount of light travels through the optical plate 20. Since the surfaces of the protruding structures 205 are slanted, incident light that may have been internally reflected on a flat surface, is refracted by the slanted surfaces of the protruding structures 205. As a result, a great amount of light is able to be outputted, from the light output surface 212, faster.

In addition, the protruding structures 205 can condense and collimate emitted light, thereby improving a light illumination brightness. Furthermore, because the LED 25 is positioned in the lamp-receiving portion 204, light is uniformly outputted from the light output surface 202 of the optical plate 20, except that the portion above the LED 25 has a relatively low illumination. Light from the optical plate 20 can be further substantially mixed in a chamber between the optical plate 20 and the light diffusion plate 23, and finally uniform surface light is outputted from the light diffusion plate 23. A distance from the LED 25 to the light diffusion plate 23 may be configured to be very small, with little or no potential risk of having dark areas on the portion of the backlight module 200 directly above the LED 25. Accordingly, the backlight module 200 can have a thin configuration while still providing good, uniform optical performance.

It should be pointed out that, the light reflective plate 22 can be omitted. In an alternative embodiment, a high reflective film can be deposited on inner surfaces of the base 211 and the sidewalls 213 of the housing 21. In other alternative embodiment, the housing 21 is made of metal materials, and has high reflective inner surface.

It is to be understood that, in order to improve brightness of the backlight module 200 within a specific viewing range, the backlight module 200 can further include a prism sheet 24 positioned on the light diffusion plate 23. In addition, in order to improve light energy utilization rate of the backlight module 200, the light reflective plate 22 can further include four reflective sidewalls 223 extending around a periphery thereof and contacting with the sidewalls 213 of the housing 21 respectively.

It is noted that the scope of the present optical plate is not limited to the above-described embodiments. In particular, even though specific shape of protruding structures 205 has been described and illustrated, the protruding structures (stacked conical frustums) 205 can have various other suitable shapes. For example, each protruding structure can be only one conical frustum.

Figure 6:
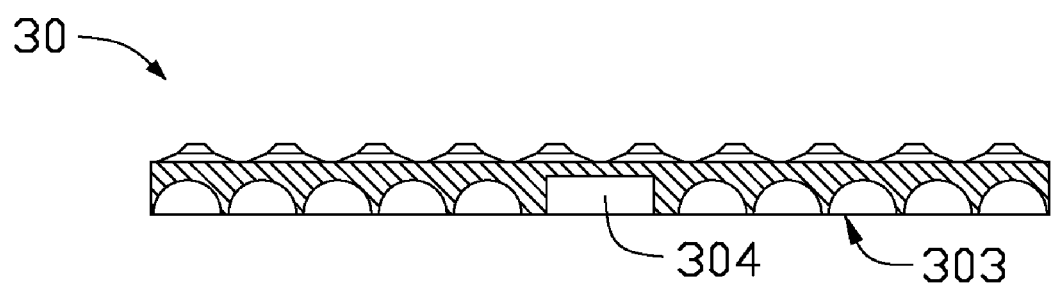
FIG. 6 is a side cross-sectional view of an optical plate according to a second preferred embodiment of the present invention.

Referring to FIG. 6, an optical plate 30 in accordance with a second preferred embodiment is shown. The optical plate 30 is similar in principle to the optical plate 20 of the first embodiment, however a lamp-receiving portion 304 defined in a bottom surface 303 of the optical plate 30 is a blind hole. It should be pointed out that, a LED including a reflective member applied on the top of the light-emitting portion can be mounted into the lamp-receiving portion 304 of the optical plate 30 to form a backlight module. Alternatively, a reflective member of the LED can be also positioned on a part of the optical plate 30 above the lamp-receiving portion 304.

Figure 7:
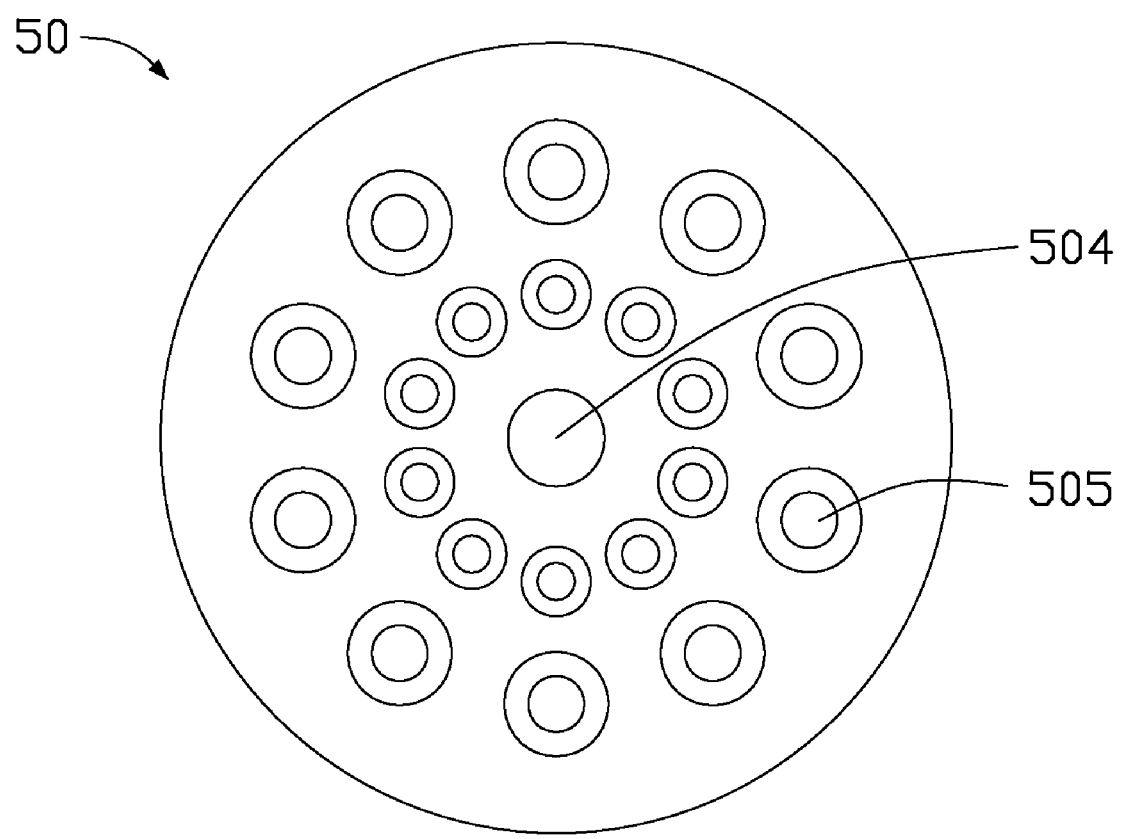
FIG. 7 is a top plane view of an optical plate according to a third preferred embodiment of the present invention.

Referring to FIG. 7, an optical plate 50 in accordance with a third preferred embodiment is shown. The optical plate 50 is similar in principle to the optical plate 20, excepts that protruding structures 505 are distributed radially in a symmetric manner with respect to a lamp-receiving portion 504, a diameter of a base of each of the protruding structures 505 increases with increasing distance from the lamp-receiving portion 504. This configuration of the optical plate 50 may have a relatively good uniformity of light output.

Figure 8:
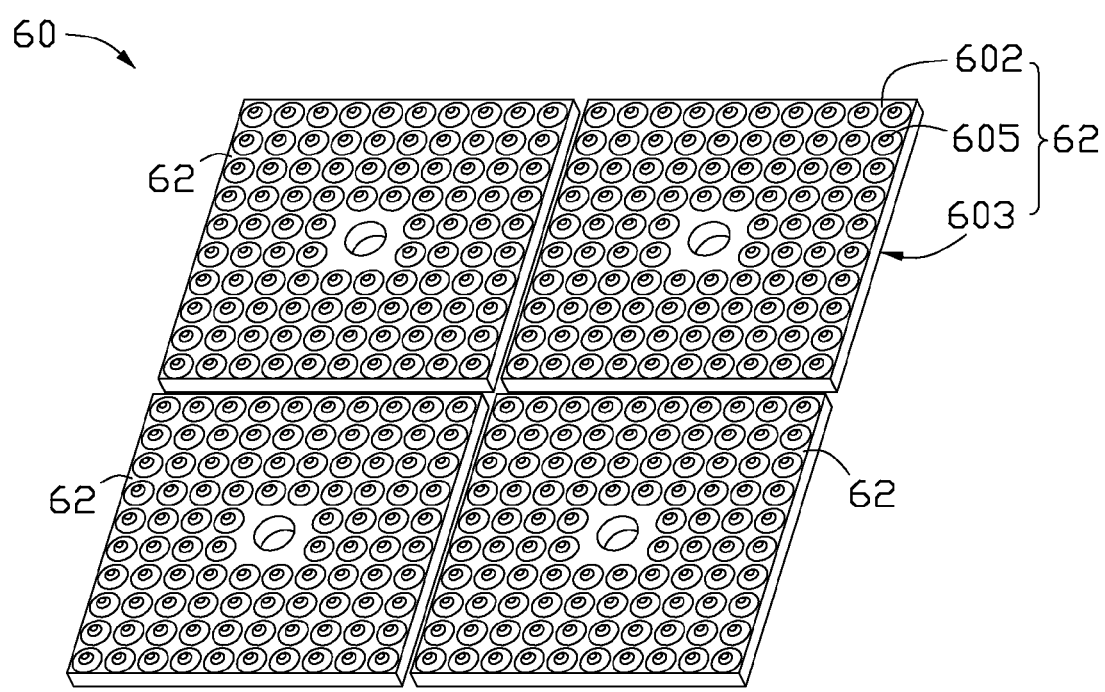
FIG. 8 is an exploded, isometric view of an optical plate according to a fourth preferred embodiment of the present invention.
Figure 9:
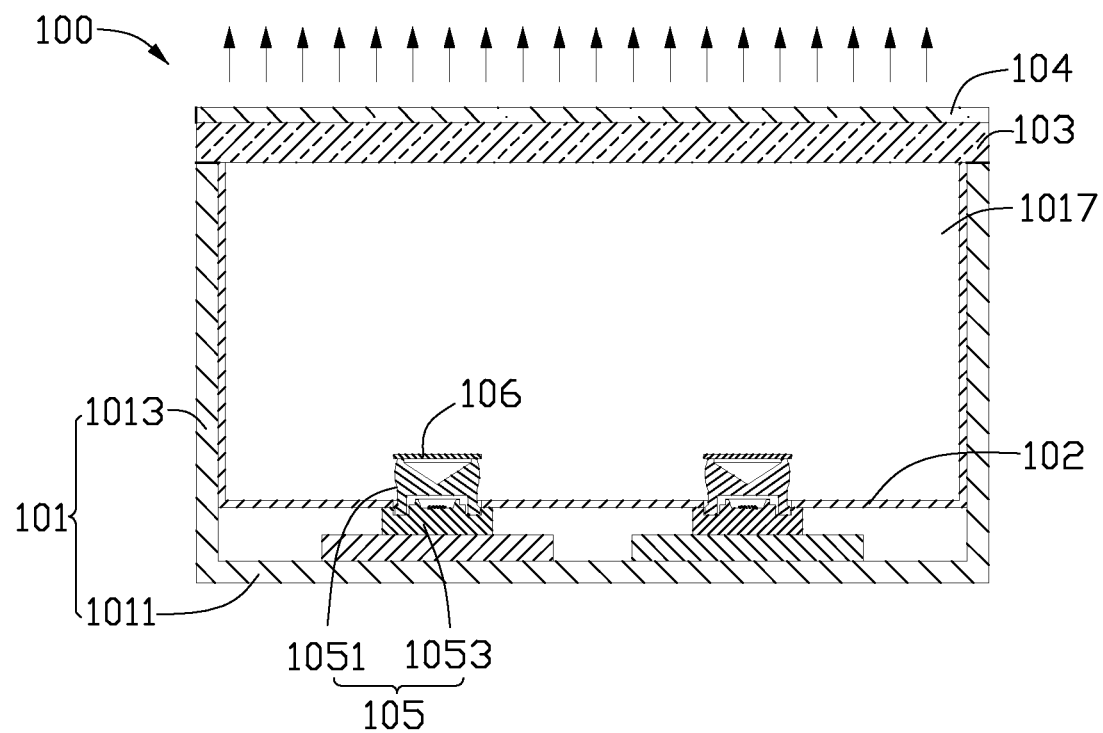
FIG. 9 is a side cross-sectional view of a conventional backlight module.

Referring to FIG. 8, an optical plate 60 in accordance with a fourth preferred embodiment is shown. The optical plate 60 includes four transparent plate sections 62. Each transparent plate section 62 is the same as the optical plate 20 of the first embodiment. Each transparent plate section 62 includes a light output surface 602 and a bottom surface 603 on another side of the transparent plate sections 62 opposite to the light output surface 602, a plurality of protruding structures 605 are formed on the light output surface 602, a plurality of spherical depressions (not shown) are formed in the bottom surface 603, and a lamp-receiving portion (not labelled) communicating between the light output surface 602 and the bottom surface 603. The four transparent plate sections 62 are tightly arranged side by side to form the assembled optical plate 60. It is to be understood that four LEDs and the combined optical plate 60 can be mounted into a housing to form a larger size backlight module.

In a backlight module using the combined optical plate of the fourth embodiment, a plurality of red, green, and blue colored LEDs can be inserted into the lamp-receiving portions of the combined optical plates, such that a mixed white surface light can be obtained. It is to be understood that other kinds of point light source, such as field emission lamps and so on, can replace the LED 25 in above embodiments.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical plate comprising:
   at least one transparent plate section having:
   a first surface;
   a second surface opposite to the first surface;
   a plurality of spherical depressions formed on the first surface;
   a plurality of protruding structures formed on the second surface, each protruding structure consisting of a first conical frustum and a second conical frustum positioned on top of the first conical frustum, wherein an angle defined between a conical surface of the first conical frustum relative to a base of the first conical frustum is equal to or smaller than an angle defined between a conical surface of the second conical frustum relative to a base of the second conical frustum, and the two conical frustums are aligned at a center axis and stacked together; and
   at least one lamp-receiving portion defined in at least one of the first surface and the second surface.

2. The optical plate according to claim 1, wherein the angle defined between a conical surface of the first conical frustum relative to a base of the first conical frustum or defined between a conical surface of the second conical frustum relative to a base of the second conical frustum is larger than zero, and equal to or smaller than 60 degrees.

3. The optical plate according to claim 1, wherein a diameter of a base of each protruding structure is configured to be in a range from about 0.02 millimeters to about 4 millimeters.

4. The optical plate according to claim 1, wherein a height of each protruding structure is configured to be in a range from about 0.01 millimeters to about 3 millimeters.

5. The optical plate according to claim 1, wherein the protruding structures are distributed radially in a symmetric manner with respect to the at least one lamp-receiving portion, a diameter of a base of each of the protruding structures increases with increasing distance from the at least one lamp-receiving portion.

6. The optical plate according to claim 1, wherein the spherical depressions are distributed on the first surface in a matrix manner surrounding the lamp-received portion.

7. The optical plate according to claim 1, wherein a radius defined by each spherical depression is preferably in a range from about 0.01 millimeters to about 2 millimeters, a maximum depth of each spherical depression is in a range from about 0.01 millimeters to about 2 millimeters.

8. The optical plate according to claim 1, wherein the at least one lamp-receiving portion is selected from one of blind hole and through hole communicating with the first surface and the second surface.

9. The optical plate according to claim 1, wherein the optical plate includes a plurality of transparent plate sections, the transparent plate sections are tightly combined with each other.

10. A backlight module comprising:
    a housing having a base and a plurality of sidewalls extending around a periphery of the base, the base and the sidewalls cooperatively forming an opening;
    at least one point light source positioned on the base, and having a light-emitting portion and a reflective member positioned above a top of the light-emitting portion;
    an optical plate positioned in the housing, the optical plate including at least one transparent plate section having:
    a first surface;
    a second surface opposite to the first surface;
    a plurality of spherical depressions formed on the first surface;
    a plurality of protruding structures formed on the second surface, each protruding structure consisting of a first conical frustum and a second conical frustum positioned on top of the first conical frustum, wherein an angle defined between a conical surface of the first conical frustum relative to a base of the first conical frustum is equal to or smaller than an angle defined between a conical surface of the second conical frustum relative to a base of the second conical frustum, and the two conical frustums are aligned at a center axis and stacked together; and at least one lamp-receiving portion defined in at least one of the first surface and the second surface, wherein the light-emitting portion of the at least one point light source is inserted in the at least one lamp-receiving portion correspondingly; and a light diffusion plate positioned on the housing atop the opening.

11. The backlight module according to claim 10, further comprising a light reflective plate defining a through hole therein, the light reflective plate being positioned underneath a bottom surface of the optical plate, and the at least one point light source passing through the light reflective plate via the through hole.

12. The backlight module according to claim 10, wherein the light reflective plate further comprises a plurality of reflective sidewalls extending around a periphery thereof and in contact with the sidewalls of the housing.

13. The backlight module according to claim 10, wherein the housing is made of metal materials, and has high reflective inner surface.

14. The backlight module according to claim 10, further comprising a high reflective film deposited on inner surface of the base and the sidewalls of the housing.

15. The backlight module according to claim 10, further comprising a prism sheet positioned on the light diffusion plate.

* * * * *